United States Patent [19]

Hino et al.

[11] Patent Number: 5,147,457
[45] Date of Patent: Sep. 15, 1992

[54] CORRECTION STICK

[75] Inventors: Heijiro Hino; Shigeo Asada, both of Osaka, Japan

[73] Assignee: Fuekinori Kogyo Kabushiki Kaisha, Osaka, Japan

[21] Appl. No.: 597,302

[22] Filed: Oct. 12, 1990

[30] Foreign Application Priority Data

Oct. 12, 1989 [JP] Japan ................. 1-265492

[51] Int. Cl.$^5$ ................. C09D 13/00; C09D 10/00
[52] U.S. Cl. ................. 106/19; 106/21; 106/23; 106/241; 106/272; 106/281.1; 106/400; 106/401; 106/436; 106/437; 523/164
[58] Field of Search .............. 106/19, 21, 23, 241, 106/272, 281.1, 400, 401, 436, 437; 523/164

[56] References Cited

U.S. PATENT DOCUMENTS

| Re. 30,747 | 11/1981 | Muszik et al. | 106/211 |
| 2,398,559 | 4/1946 | Robinson | 106/19 |
| 2,976,285 | 3/1961 | Gash | 106/19 |
| 4,992,502 | 2/1991 | Loftin et al. | 524/275 |

*Primary Examiner*—William R. Dixon, Jr.
*Assistant Examiner*—Scott L. Hertzog
*Attorney, Agent, or Firm*—Wenderoth, Lind & Ponack

[57] ABSTRACT

Correction stick comprising a gelatinizer, white pigments, dispersant, water-soluble or dispersible film-forming resin and a gelation modifier, said gelatinizer being alkali metal salts or ammonium salts of aliphatic carboxylic acids having carbon atoms of 8 to 36 and said gelation modifier being organic or inorganic salts which form univalent metallic positive ion in an aqueous solution such as sodium or potassium positive ion or sequestering agents or the mixture thereof with the organic or inorganic salts.

10 Claims, No Drawings

CORRECTION STICK

BACKGROUND OF THE INVENTION

1. Field of the Invention

The present invention relates to a correction stick of solid type for making corrections of mistakes in writing.

2. Prior Art

Correction fluids, that is, correction materials of solution type have been used for making corrections of mistakes in writing or mistyping, however, there have been experienced some drawbacks such as (1) applicator such as brushes being required, (2) dispersed pigments being liable to settle out when correction fluids being left to stand for a considerable time, (3) correction fluids being thickened gradually by volatility loss of solvent in a reservoir and spreadability getting worse, (4) fluids being spilled when a reservoir falls down and (5) consecutive use being limited when correction fluids being applied with brushes.

The above mentioned drawbacks may be solved by using a correction stick. Heretofore, there have been made some proposals for providing a correction stick but commercial production has not been made, because it was difficult to obtain a correction stick having good properties in hardness, spreadability and opacifying effect. Said difficulty was caused by a gelatinizer.

For example, Japanese patent applications laid open under No. 51-10652 and No. 58-162674 employed benzalsorbitol as a gelatinizer. When said gelatinizer is used in an amount to form a gel having a practical hardness (fracture strength 3,500–6,000 g), a correction material is hardly transferred on a paper product. As a result, the opacifying effect is low. On the contrary, when the amount of said gelatinizer is reduced to obtain practical opacifying effect, practical hardness can not be obtained. Said gelatinizer is not preferred from the view point of safety and sanitation. Further a heat-sensitive paper product is subjected to shade change. Oil ink is apt to run.

Alkali metal salts or ammonium salts of aliphatic carboxylic acids having carbon atoms of 8 to 36 may be used as a gelatinizer, however, when said gelatinizer is used in an amount to obtain a practical hardness, a correction material obtained is easy to slip on a paper product so that good spreadability with moderate friction is not obtained. Besides transfer on a paper product is reduced and the opacifying effect is weak. In addition, the viscosity of composition for correction material becomes too high to be filled in a container. Said gelatinizer having dispersion properties, the strength of dry film formed with correction material is too weak to write thereon. Oil ink runs occasionally. On the contrary, when the amount of said gelatinizer is reduced, a practical hardness can not be obtained.

Japanese patent publication No. 56-34193 made a proposal to use wax as a gelatiner. But the use of wax affects uniform spreadability. Runaway occurs on an aqueous ink. The strength of dry film is too weak to write thereon.

SUMMARY OF THE INVENTION

In view of the above, it is the object of the present invention to provide a correction stick, i.e. correction material of solid type which has a practical hardness as well as good properties in spreadability and opacifying effect and which is preferred in safety and besides which has a good film-forming properties and further which causes little run of ink.

Consecutive researches for solving the problems reveals that gelation properties of alkali metal salts or ammonium salts of aliphatic carboxylic acids having carbon atoms of 8 to 36 are improved without affecting spreadability and opacifying effect, when organic or inorganic salts which form univalent metallic positive ion in an aqueous solution or sequestering agents are used as a gelation modifier. Accordingly, the correction stick in accordance with the present invention includes said gelation modifier.

Namely the present invention provides a correction stick comprising a gelatinizer, white pigments, dispersant, water-soluble or dispersible film-forming resin and a gelation modifier, said gelatinizer being alkali metal salts of ammonium salts of aliphatic carboxylic acids having carbon atoms of 8 to 36 and said gelation modifier being organic or inorganic salts which form univalent metallic positive ion in an aqueous solution. In accordance with the present invention, said gelation modifier may be sequestering agents or mixture of the above organic or inorganic salts with sequestering agents.

Inorganic salts such as sodium salts or potassium salts e.x. sodium chloride, potassium chloride, sodium nitrate, potassium nitrate, sodium sulfate or potassium sulfate are available for the salts which form univalent metallic positive ion in an aqueous solution. Univalent salts which form sodium positive ion or potassium positive ion are preferred. Potassium salts are preferred to be composed with potassium positive ion and univalent negative ion.

Organic salts are carbocyclic carboxy compounds such as sodium benzoate, sodium p-hydroxybenzoate, sodium p-isopropylbenzoate, sodium phthalate, sodium terephthalate, sodium isophthalate, sodium benzenpentacarboxylate, sodium fluorobenzoate, sodium chlorobenzoate, sodium anisate, sodium vanillate, sodium isovanillate etc. Organic salts of aliphatic carboxy compounds, such as sodium formate, sodium acetate, sodium propionate, etc. are also available. Most preferable salts are sodium salts or complex salts of resins which can be obtained by copolymerization of acrylic methyl ester, acrylic ethyl ester and vinyl compounds such as vinyl acetate or styrene or such ester as acrylic butyl ester or ethylhexyl. Especially emulsion type of these salts is the best.

It is preferred that both organic and inorganic salts have high solubility in water. The additive amount thereof is preferred to be 0.1–10 wt % in the whole contents. In case the additive amount is less than 0.1 wt %, gelation properties can not be improved. In case it exceeds 10 wt %, spreadability deteriorates. Most preferable range is 2–5 wt %.

Sequestering agents are ethylenediaminetetraacetic acids and their derivatives such as EDTA4H, EDTA2Na, EDTA4Na, EDTA3Na, HEDTA3Na, DTPA5Na, TTHA6Na, NTA3Na, amine salts of EDTA, EDTA2NH$_4$, EDTA3NH$_4$ or EDTA3K. Also available are organic acids and inorganic acids and their derivatives such as glucronic acid, sodium glucronate, citric acid, sodium citrate, tartaric acid, sodium tartarate, pyrophosphoric acid, sodium pyrophosphate, tripolyphosphoric acid, sodium tripolyphosphate, tetramethaphospholic acid or sodium tetramethaphosphate. Any other sequestering agents may be applicable.

The additive amount of sequestering agents is preferred to be 0.1–10 wt %. In case the additive amount is less than 0.1 wt %, gelation properties can not be improved. In case it exceeds 10 wt %, spreadability deteriorates. Most preferable range is 0.1–5 wt %.

Alkali metal salts or ammonium salts of aliphatic carboxylic acids having carbon atoms of 8 to 36 used for a gelatinizer are preferred to be lauric acid of 12 carbon atoms, myristic acid of 14 carbon atoms, plamitic acid of 16 carbon atoms, stearic acid of 18 carbon atoms, etc. Myristic acid of 14 carbon atoms is most preferred. The additive amount of a gelatinizer is preferred to be 2–20 wt %. In case the additive amount is less than 2 wt %, gelation properties are poor. In case it exceeds 20 wt %, opacifying effect deteriorates. Most preferable range is 2–15 wt %.

As to white pigments having the opacifying effect titanium oxide, calcium carbonate and alminium silicate are preferred. The additive amount is preferred to be 30–70 wt %. In case the amount is less than 30 wt %, opacifying effect is poor. In case it exceeds 70 wt %, spreadability deteriorates. Most preferable range is 40–60 wt %.

Dispersant for the white pigments is preferred to be of styrene-maleic acids. For example DKS-DISCOAT N-14 of Daiichi Kogyo Seiyaku Kabushi Kaisha (30% solution, DISCOAT is the trademark of Daiichi Kogyo Seiyaku Kabushi Kaisha) is available. The additive amount is preferred to be 0.02–5 wt %. In case the amount is less than 0.02 wt %, dispersion properties are poor. In case it exceeds 5 wt %, dispersion properties are not improved. Most preferable range is 0.5–3 wt %.

Water-soluble or dispersible film-forming resins are preferred to be starch, starch derivatives, starch decomposition products such as dextrin, polyvinyl alcohol, polyvinyl pyrrolidone, salt or ester of polyacrylic acid or methacrylic acid, emulsion copolymer of ester, and cellulose derivatives such as carboxymethylcellulose (CMC). The additive amount is preferred to be 0.2–15 wt %. In case the amount is less than 0.2 wt %, film-forming properties are poor. In case it exceeds 15 wt %, adhesion is caused by said resin and besides thixotropic properties of solid deteriorates so that spreadability is poor. Most preferable range is 0.5–10 wt %.

In addition to the above components, humectant, perfume, preservative, color pigments for matching the color of a paper product may be mixed.

In accordance with the present invention, the additive amount of the gelatinizer, i.e. alkali metal salts of ammonium salts of aliphatic carboxylic acids having carbon atoms of 8 to 36 is limited to a certain degree and gelation properties are improved by the addition of gelation modifiers, i.e. organic or inorganic salts which form univalent metallic positive ion in an aqueous solution which do not affect spreadability and opacifying effect. Accordingly, the correction material has a practical hardness as well as good properties in spreadability and opacifying effect. The viscosity of the correction composition does not become too high and it is easy to fill it in a container. The strength of dry film is preferable. Oil ink does not run. No organic solvents being used, there occur no problems in safety and sanitation.

DETAILED DESCRIPTION OF THE INVENTION

The present invention will now be described more speficially in accordance with the preferred embodiments.

EMBODIMENT 1

In a reactor provided with agitator, reflux condenser, dropping device and thermometer, 38.5 pbw of water and 1 pbw of dispersant of styrene-maleic acids (DKS-DISCOAT N-14 of Daiichi Kogyo Seiyaku Kabushiki Kaisha) were poured and 50 pbw of titanium oxide were added while being mixed and stirred well. 5 pbw of CMC, 5 pbw of sodium myristate and 0.5 pbw of sodium chloride are added and stirred well at a temperature of 80° to 90° C. Then the mixture was poured into a lip stick container to set up.

EMBODIMENTS 2 and 3

3.5 pbw of sodium chloride was used in Embodiment 2 instead of water in Embodiment 1. 4.0 pbw of sodium chloride was used in Embodiment 3 instead of water in Embodiment 1. Other conditions were the same as in Embodiment 1.

EMBODIMENTS 4 to 6

Embodiment 4: 0.5 pbw of sodium benzoate was used instead of 0.5 pbw of sodium chloride in Embodiment 1

Embodiment 5: 5.5 pbw of sodium benzoate was used instead of water in Embodiment 1

Embodiment 6: 4.0 pbw of sodium benzoate was used instead of water in Embodiment 1

Other conditions were the same as in Embodiment 1.

EMBODIMENTS 7 to 10

Embodiment 7: 0.5 pbw of EDTA2Na was used instead of 0.5 pbw of sodium chloride in Embodiment 1

Embodiment 8: 4.5 pbw of EDTA2Na was used instead of water in Embodiment 1

Embodiment 9: 1.5 pbw of EDTA2Na was used instead of water in Embodiment 1

Embodiment 10: 3.0 pbw of EDTA2Na was used instead of water in Embodiment 1

Other conditions were the same as in Embodiment 1.

EMBODIMENTS 11 and 12

Embodiment 11: 1 pbw of EDTA2Na was used instead of water in Embodiment 1

Embodiment 12: 0.5 pbw of sodium chloride and 0.5 pbw of EDTA2Na were used instead of 1 pbw of water in Embodiment 1

Other conditions were the same as in Embodiment 1.

EMBODIMENTS 13 to 17

Embodiment 13: 1.2 pbw of sodium benzoate was used instead of 0.5 pbw of sodium chloride and 0.7 pbw of water in Embodiment 1

Embodiment 14: 1.8 pbw of sodium phthalate was used instead of 0.5 pbw of sodium chlorid and 1.3 pbw of water in Embodiment 1

Embodiment 15: 1.2 pbw of sodium acetate was used instead of 0.5 pbw of sodium chloride and 0.7 pbw of water in Embodiment 1

Embodiment 16: 0.8 pbw of sodium propionate was used instead of 0.5 pbw of sodium chloride and 0.3 pbw of water in Embodiment 1

Embodiment 17: 0.6 pbw of potassium chloride was used instead of 0.5 pbw of sodium chloride and 0.1 pbw of water in Embodiment 1

Other conditions were the same as in Embodiment 1.

EXAMPLES FOR COMPARISON

Comparison 1:

0.5 pbw of water was used instead of 0.5 pbw of sodium chloride in Embodiment 1

Comparison 2:
Sodium myristate replaced 10 pbw of water in Comparision 1

Comparison 3:
Sodium laurate replaced 5.0 pbw of sodium myristate and 13.0 pbw of water in Comparision 1

Comparison 4:
Sodium palmitate replaced 5.0 pbw of sodium myristate and 11.0 pbw of water in Comparision 1

Comparison 5:
Sodium stearate replaced 5.0 pbw of sodium myristate and 9.0 pbw of water in Comparision 1

Comparison 6:
Titanium oxide replaced 15.0 pbw of water in Comparision 1

Comparison 7:
1.3 pbw of calcium chloride replaced 0.5 sodium chloride and 0.8 pbw of water in Embodiment 1

Comparison 8:
1.5 pbw of copper chloride replaced 0.5 pbw of sodium chloride and 1.0 pbw of water in Embodiment 1

Comparison 9:
1.1 pbw of alminium chloride replaced 0.5 pbw of sodium chloride and 0.6 pbw of water in Embodiment 1

Comparison 10:
2.3 pbw of ferric chloride replaced 0.5 pbw of sodium chloride and 1.8 pbw of water in Embodiment 1

Other conditions were the same as in Embodiment 1. Test results are as shown in Tables 1 to 5. Test conditions are as follows.

Fracture strength:
The strength(g) was measured by RHEO METER(NRM-2010J-CW) of FUDOH KOGYO CO., LTD. using an adapter for measuring compression and elasticity when a sample(diameter:8 mm, length:5 mm) was fractured by the adapter with a compression speed of 20 mm/min at 25° C.

Spreadability:
Organoleptic test was effected as to slip when applied on a writing paper and the uniformity of spread.

Opacifying effect:
Correction material of each sample was applied with three times double stroke on the words written by a ball point pen and words copied on a writing paper. After being dried, observation was made whether or not the words could be copied.

Embodiments 1 to 17 show the improvement of fracture strength compared with Comparison 1 in spite of the fact that sodium myristate was added in the same amount, which shows the improvement of gelation properties of a correction stick by the gelation modifier such as organic or inorganic salts or sequestering agents.

In Comparison 2 and Comparison 5, the fracture strength was increased by the gelatinizer, i.e. sodium myristate and sodium stearate, but the opacifying effect deteriorated. On the contrary, Embodiments in accordance with the present invention show good results in the opacifying effect. In Comparison 3, 4 and 6, the fracture strength was increased by the gelatinizer, i.e. sodium laurate, sodium palmitate or titanium oxide, but the spreadability deteriorated. On the contrary, Embodiments show good results.

Sodium benzoate, sodium phthalate, sodium acetate and sodium propionate used as a gelation modifier show good results as shown Embodiments 13 to 16. Potassium chloride is also preferred. Although not shown in the table, sodium sulfate and sodium phosphate were also available, but potassium sulfate and potassium phosphate which are the potassium salts formed with divalent negative ion were not preferred. Accordingly, potassium salts shall be formed with univalent negative ion.

As shown in Comparison 7 to 10, when calcium chloride, copper chloride, alminium chloride and ferric chloride which have divalent or trivalent ion were used as a gelation modifier, the opacifying effect was fairly good, but the spreadability was bad. Besides they were pasty and hardly used for a correction stick.

TABLE 1

|  | EMBODIMENTS | | | | | |
|---|---|---|---|---|---|---|
|  | 1 | 2 | 3 | 4 | 5 | 6 |
| sodium myristate | 5 | 5 | 5 | 5 | 5 | 5 |
| dispersant | 1 | 1 | 1 | 1 | 1 | 1 |
| CMC | 5 | 5 | 5 | 5 | 5 | 5 |
| titanium oxide | 50 | 50 | 50 | 50 | 50 | 50 |
| sodium chloride | 0.5 | 4 | 8 | — | — | — |
| sodium benzoate | — | — | — | 0.5 | 6 | 10 |
| EDTA2Na | — | — | — | — | — | — |
| water | 38.5 | 35 | 31 | 38.5 | 33 | 29 |
| fracture strength (g) | 4950 | 5300 | 5800 | 4200 | 5000 | 5400 |
| spreadability |  |  |  |  |  |  |
| slip | G | G | FG | G | FG | FG |
| uniformity | G | G | FG | G | FG | FG |
| opacifying effect | G | G | FG | G | FG | FG |

TABLE 2

|  | EMBODIMENTS | | | | | |
|---|---|---|---|---|---|---|
|  | 7 | 8 | 9 | 10 | 11 | 12 |
| sodium laurate | — | — | — | — | — | — |
| sodium palmitate | — | — | — | — | — | — |
| sodium stearate | — | — | — | — | — | — |
| sodium myristate | 5 | 5 | 5 | 5 | 5 | 5 |
| dispersant | 1 | 1 | 1 | 1 | 1 | 1 |
| CMC | 5 | 5 | 5 | 5 | 5 | 5 |
| titanium oxide | 50 | 50 | 50 | 50 | 50 | 50 |
| sodium chloride | — | — | — | — | 0.5 | 1 |
| sodium benzoate | — | — | — | — | — | — |
| EDTA2Na | 0.5 | 5 | 6.5 | 9.5 | 1 | 1.5 |
| water | 38.5 | 34 | 32.5 | 29.5 | 37.5 | 36.5 |
| fracture strength (g) | 4100 | 5400 | 5700 | 6000 | 5000 | 5600 |
| spreadability |  |  |  |  |  |  |
| slip | G | G | FG | FG | G | G |
| uniformity | G | G | FG | FG | G | G |
| opacifying effect | G | G | FG | FG | G | G |

*In all tables, G denotes "good", FG denotes "fairly goods" and B denotes "bad".

TABLE 3

|  | EMBODIMENTS | | | | |
|---|---|---|---|---|---|
|  | 13 | 14 | 15 | 16 | 17 |
| sodium laurate | — | — | — | — | — |
| sodium palmitate | — | — | — | — | — |
| sodium stearate | — | — | — | — | — |
| sodium myristate | 5 | 5 | 5 | 5 | 5 |
| dispersant | 1 | 1 | 1 | 1 | 1 |
| CMC | 5 | 5 | 5 | 5 | 5 |
| titanium oxide | 50 | 50 | 50 | 50 | 50 |
| sodium benzoate* | 1.2 | — | — | — | — |
| sodium phtharate* | — | 1.8 | — | — | — |
| sodium acetate* | — | — | 1.2 | — | — |
| sodium propionate* | — | — | — | 0.8 | — |
| KCl | — | — | — | — | 0.6 |
| water | 37.8 | 37.2 | 37.8 | 38.2 | 38.4 |
| fracture strength (g) | 4400 | 5700 | 5300 | 4200 | 4000 |
| spreadability |  |  |  |  |  |
| slip | G | G | G | G | G |
| uniformity | G | G | G | G | G |

TABLE 3-continued

|  | EMBODIMENTS | | | | |
| --- | --- | --- | --- | --- | --- |
|  | 13 | 14 | 15 | 16 | 17 |
| opacifying effect | G | G | G | G | G |

*Additive amount of sodium salts as a gelation modifier is equimolar with that of sodium chloride in Embodiment 1.

TABLE 4

|  | COMPARISON | | | | | |
| --- | --- | --- | --- | --- | --- | --- |
|  | 1 | 2 | 3 | 4 | 5 | 6 |
| sodium laurate | — | — | 18 | — | — | — |
| sodium palmitate | — | — | — | 16 | — | — |
| sodium stearate | — | — | — | — | 14 | — |
| sodium myristate | 5 | 15 | — | — | — | 5 |
| dispersant | 1 | 1 | 1 | 1 | 1 | 1 |
| CMC | 5 | 5 | 5 | 5 | 5 | 5 |
| titanium oxide | 50 | 50 | 50 | 50 | 50 | 50 |
| sodium chloride | — | — | — | — | — | — |
| sodium benzoate | — | — | — | — | — | — |
| EDTA2Na | — | — | — | — | — | — |
| water | 39 | 29 | 26 | 28 | 30 | 24 |
| fracture strength (g) | 2500 | 4800 | 4300 | 4200 | 4400 | 3800 |
| spreadability |  |  |  |  |  |  |
| slip | FG | FG | B | B | FG | B |
| uniformity | B | FG | B | B | B | B |
| opacifying effect | FG | B | FG | FG | B | FG |

TABLE 5

|  | COMPARISON | | | |
| --- | --- | --- | --- | --- |
|  | 7 | 8 | 9 | 10 |
| sodium laurate | — | — | — | — |
| sodium palmitate | — | — | — | — |
| sodium stearate | — | — | — | — |
| sodium myristate | 5 | 5 | 5 | 5 |
| dispersant | 1 | 1 | 1 | 1 |
| CMC | 5 | 5 | 5 | 5 |
| titanium oxide | 50 | 50 | 50 | 50 |
| $CaCl_2.2H_2O$* | 1.3 | — | — | — |
| $CuCl_2.2H_2O$* | — | 1.5 | — | — |
| $AlCl_3$* | — | — | 1.1 | — |
| $FeCl_3.6H_2O$* | — | — | — | 2.3 |
| water | 37.7 | 37.5 | 37.9 | 36.7 |
| fracture strength (g) | 840 | 960 | 720 | 600 |
| spreadability |  |  |  |  |
| slip | B | B | B | B |
| uniformity | B | B | B | B |
| opacifying effect | FG | FG | FG | FG |

*Additive amount is equimolar with that of sodium chloride in Embodiment 1.

We claim:

1. Correction sticks comprising 2-20 wt % of a gelatinizer, 30-70 wt % of white pigments, 0.02-5 wt % of a dispersant and 0.2-15 wt % of a water-soluble or dispersible film-forming resin and 0.1-10 wt % of a gelation modifier, said gelatinizer being alkali metal salts or ammonium salts of aliphatic carboxylic acids having 8 to 36 carbon atoms and said gelation modifier being organic or inorganic salts which form univalent metallic positive ions in an aqueous solution.

2. Correction sticks as claimed in claim 1, wherein said organic or inorganic salts form sodium positive ions or potassium positive ions.

3. Correction sticks as claimed in claim 2, wherein said organic or inorganic salts which form potassium positive ions are made with univalent negative ions.

4. Correction sticks comprising a gelatinizer, white pigments, a dispersant, a water-soluble or dispersible film-forming resin and a gelation modifier, said gelatinizer being alkali metal salts or ammonium salts of aliphatic carboxylic acids having 8 to 36 carbon atoms and said gelation modifier being sequestering agents or mixtures thereof with the organic or inorganic salts which form univalent metallic positive ion in an aqueous solution.

5. Correction stick as claimed in claim 4, wherein said organic or inorganic salts form sodium positive ion or potassium positive ions.

6. Correction stick as claimed in claim 4, wherein said organic or inorganic salts which form potassium positive ions are made with univalent negative ions.

7. Correction sticks as claimed in claim 1, wherein said gelatinizer is selected from the group consisting of sodium laurate, sodium myristate, sodium stearate and sodium palmitate in an amount of 2-20 wt %.

8. Correction sticks as claimed in claim 1, wherein said gelation modifier is an organic or inorganic sodium salt in amounts of 0.1-10 wt %.

9. Correction sticks as claimed in claim 1, wherein said film-forming resins are selected from the group consisting of starch, starch derivatives, dextrin, polyvinyl alcohol, polyvinyl pyrrolidone, salts or esters of polyacrylic acid or methacrylic acid, an emulsion copolymer of an ester and carboxymethylcellulose.

10. Correction sticks as claimed in claim 4, wherein 0.1-10 wt % of sequestering agents are used as gelation modifiers.

* * * * *